Feb. 5, 1957 A. BREUER ET AL 2,780,114
OVERHUNG ROTARY SHEARS FOR CONTINUOUSLY
TRAVELLING ROLLED MATERIAL
Filed Sept. 8, 1952 2 Sheets-Sheet 1

INVENTORS
A. Breuer
F. Wirth
ATTYS.

Feb. 5, 1957 A. BREUER ET AL 2,780,114
OVERHUNG ROTARY SHEARS FOR CONTINUOUSLY
TRAVELLING ROLLED MATERIAL
Filed Sept. 8, 1952 2 Sheets-Sheet 2

INVENTOR
A. Breuer
F. Wirth
By ATTYS.

United States Patent Office 2,780,114
Patented Feb. 5, 1957

2,780,114

OVERHUNG ROTARY SHEARS FOR CONTINUOUSLY TRAVELLING ROLLED MATERIAL

Alfred Breuer, Dusseldorf, and Friedrich Wirth, Wittlaer, Germany, assignors to Schloemann Aktiengesellschaft, Dusseldorf, Germany Application September 8, 1952, Serial No. 308,452

Claims priority, application Germany September 24, 1951

1 Claim. (Cl. 74—665)

This invention relates to overhung shears with a rotary drive for continuously travelling rolled material, which performs one cut from an initial position and returns after completing the cut into the initial position. The exact return of the shears after completion of the cut into the initial position offers certain technical difficulties for the reason that the positive and negative accelerations of the shears are great. In order to deal with this difficulty it has already been proposed to bring the shears to rest before or after the initial position at a not exactly determined place by means of a brake and thereupon to return them into the initial position by other means, for instance by hand.

The invention is thus based on overhung shears with a rotary drive for continuously travelling rolled material and provided with means for arresting the movement of the shears and is characterised in this that the arresting means are capable of rotating and being fixed in position. The arresting means can thus, after they have, owing to the braking force, been coupled with the shaft of the shears, be turned so as to bring the shears in this way back into the initial position. This can be effected by the arresting means being driven by a separate motor, preferably through worm gear.

A particularly suitable arrangement is obtained, if a toothed wheel which is fixed to the shears shaft and is driven by a driving pinion be geared with a second pinion which is adapted to be driven by way of a disc or laminated coupling. The driving pinion for the toothed wheel may be driven either by way of a disc or laminated coupling by an uncontrolled, continuously running driving motor or by a controlled driving motor.

The adoption of the first-mentioned proposal is to be recommended for the reason that with the laminated coupling which provides the possibility of coupling at any time a great and sudden torque transmission can be effected.

Figure 1:
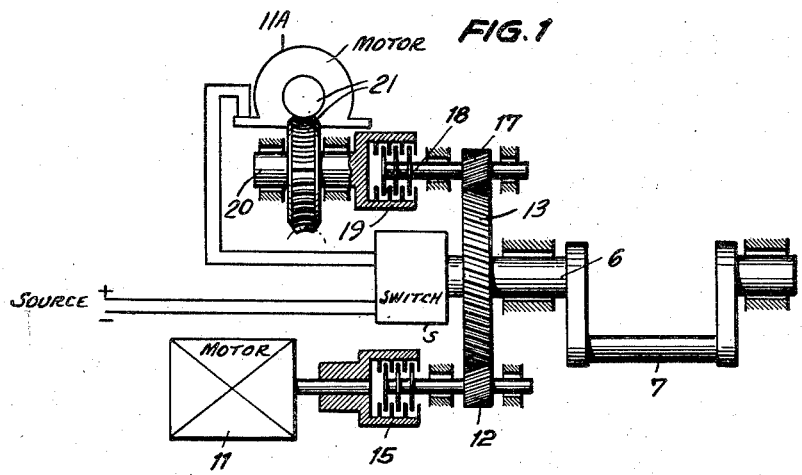
Figure 2:
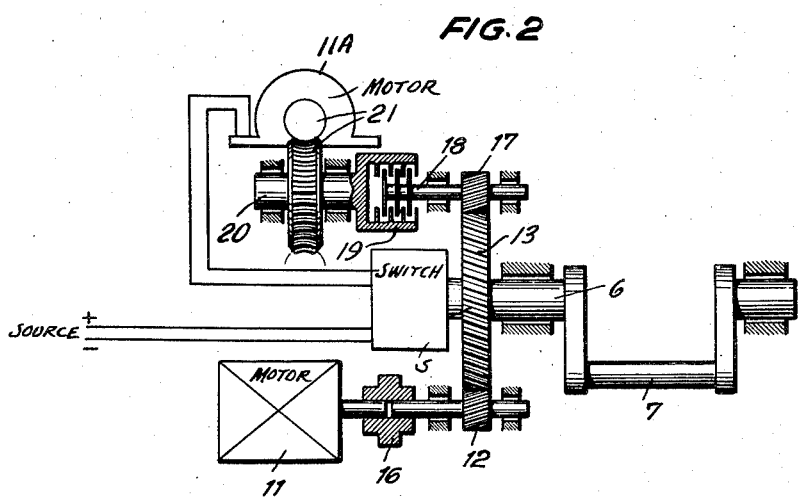
Figure 3:
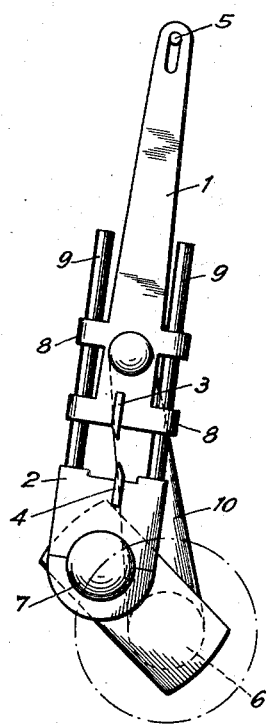

The accompanying drawing illustrates two constructional examples of the invention in Figures 1 and 2, whilst Figure 3 explains the known shears parts.

In Figure 3 of the drawing the parts 1 and 2 are the carriers of the upper and lower cutter 3 and 4. The cutter carrier 1 has the form of a simple swinging member adapted to turn about the pivot pin 5, whilst the cutter carrier 2 is mounted rotatably on the crank pin 7 of the crank shaft 6. The pivot pin 5 is mounted on the machine frame. The eyes 8 on the swinging member 1 form together with the rods 9 guided in them and fixed to the cutter carrier 2 a sliding guide which also performs the function of a driver. Rotatably attached to the cutter carrier 1 is a link member (or pair of link members) 10 which can turn about the crank shaft 6. This link member also acts as a distance piece between 6 and 8 and has the further function of taking up the shearing stresses. After a cut has been finished (the crank shaft rotates in the clockwise sense), the lower cutter moves quickly downwards, passing out of range of the rolled material, whereas the upper cutter completes its swing to the right and then swings back again so as to move back into the initial position. Thus, in its rotary motion the cutter carrier 2 imparts to the swinging cutter 1 a to and fro motion. In view of the connection of the cutter carrier 1 with the crank shaft 6 the pivot pin 5 is embraced by a slot in the cutter carrier 1, so that, on the link member 10 rocking to and fro, the carrier 1 can move slightly upwards and downwards on the pin 5. The rolled material is fed forward at such a level that it will not come in contact with the cutter 3 in its backward swing. For the cut it is raised by the cutter 4. The parts of the shears so far described are known and form no part of the present invention.

In Figures 1 and 2 a driving motor 11 of the shears acts by way of a pinion 12 on a toothed wheel 13 of the shaft 6 of the shears. In the constructional form according to Figure 1 there is interposed between the motor 11 and the pinion 12 a laminated coupling 15, whilst in the constructional example according to Figure 2 an elastic coupling 16 is provided. The drive according to Figure 1 operates with a continuously running motor and a controlled coupling 15, whilst in the form according to Figure 2 the motor itself is controlled.

Besides the pinion 12 there is in both constructional examples in mesh with the toothed wheel 13 a pinion 17, the shaft 18 of which is adapted to be coupled by way of a laminated coupling 19 with the shaft 20. The shaft 20 is adapted to be driven through worm gearing 21 by a second motor 11A which can be controlled by a switch S which is mounted on the shaft 6 and controls the motor in such a manner that the shaft is returned after the period of rest automatically into the initial position. If the coupling 19 is closed while the worm is stationary, the shafts 18 and 6 will obviously be braked by the known self-locking action of the worm gear.

According to requirements provision may be made for the drive of the shears to be braked in such a manner that the shears cutters will come to rest always before or always after their initial position. In both constructional examples the braking action is applied by the laminated coupling 19. Following the braking action the shears shaft 6 will then be turned forward or backward by an amount which will bring the shears into their initial position.

We claim:

In a rotary driving means for flying shears or the like, a crank shaft, an externally toothed gear wheel drivingly connected to said shaft, a pair of shafts each carrying a pinion gear meshing with said gear wheel, a first friction coupling on one of said pair of shafts, a continuously running motor drivingly connected to said first friction coupling in such a manner that upon actuation of said coupling said crank shaft is driven by said motor, a second friction coupling on the other of said pair of shafts, worm and gear driving means drivingly connected to said second friction coupling means whereby upon actuation of said second friction coupling positive braking is applied to said gear wheel, and whereby upon rotation of said worm while said second friction coupling is locked said gear wheel may be rotated independently of said motor.

References Cited in the file of this patent

UNITED STATES PATENTS

| 2,436,572 | Henschker | Feb. 24, 1948 |
| 2,517,567 | Hill et al. | Aug. 8, 1950 |
| 2,598,633 | Baldwin | May 27, 1952 |

FOREIGN PATENTS

| 509,072 | Belgium | Feb. 29, 1952 |
| 418,774 | Germany | Sept. 18, 1925 |